(12) United States Patent
Gaur

(10) Patent No.: US 7,978,636 B2
(45) Date of Patent: Jul. 12, 2011

(54) SYSTEM AND METHOD FOR CONTROLLING THROUGHPUT OF ACCESS CLASSES IN A WLAN

(75) Inventor: Sudhanshu Gaur, Campbell, CA (US)

(73) Assignee: Hitachi, Ltd., Tokyo (JP)

( * ) Notice: Subject to any disclaimer, the term of this patent is extended or adjusted under 35 U.S.C. 154(b) by 1080 days.

(21) Appl. No.: 11/692,120

(22) Filed: Mar. 27, 2007

(65) Prior Publication Data

US 2008/0240049 A1    Oct. 2, 2008

(51) Int. Cl.
*H04M 1/00* (2006.01)
(52) U.S. Cl. ......... 370/310; 370/328; 370/329; 370/230
(58) Field of Classification Search .................. 370/310, 370/328, 229, 230, 234, 235, 349, 231, 450, 370/400, 329, 447, 477, 412
See application file for complete search history.

(56) References Cited

U.S. PATENT DOCUMENTS

| | | | | |
|---|---|---|---|---|
| 7,688,898 B1 * | 3/2010 | Lou et al. | .................. | 375/259 |
| 7,693,175 B1 * | 4/2010 | Benveniste | .................. | 370/447 |
| 2005/0271019 A1 | 12/2005 | Yuan et al. | | |
| 2006/0045050 A1 | 3/2006 | Floros et al. | | |
| 2006/0056382 A1 * | 3/2006 | Yamada et al. | ............... | 370/349 |
| 2006/0187840 A1 | 8/2006 | Cuffaro et al. | | |
| 2006/0198301 A1 | 9/2006 | Airy et al. | | |
| 2006/0221879 A1 * | 10/2006 | Nakajima et al. | ............. | 370/310 |
| 2006/0280151 A1 * | 12/2006 | Sawada | .................. | 370/338 |
| 2006/0291402 A1 | 12/2006 | Yun et al. | | |
| 2007/0127378 A1 * | 6/2007 | Yang et al. | .................. | 370/235 |
| 2009/0067326 A1 * | 3/2009 | Perrot et al. | .................. | 370/230 |

FOREIGN PATENT DOCUMENTS

WO    WO 2006/130021 A2    12/2006

* cited by examiner

*Primary Examiner* — Jean A Gelin
(74) *Attorney, Agent, or Firm* — Mattingly & Malur, PC

(57) ABSTRACT

A system comprises a monitoring module operative to monitor traffic on a wireless medium, the traffic belonging to one or more of two different access classes (ACs), one access class (AC) being a higher-priority AC and the other being a lower-priority AC; a throughput adaptation module communicatively coupled to the monitoring module and operative to dynamically generate data corresponding to one or more AC-sensitive parameters based on the monitored traffic and on a desired throughput ratio between the two different ACs; and a wireless communication module communicatively coupled to the throughput adaptation module and operative to communicate the data to one or more wireless stations on the wireless medium.

22 Claims, 8 Drawing Sheets

Default EDCA AC Parameter Set for 802.11g

| AC | CWmin | CWmax | AIFSN | TXOP limit (ms) |
|---|---|---|---|---|
| (1) AC_BK | 15 | 1023 | 7 | 0 |
| (0) AC_BE | 15 | 1023 | 3 | 0 |
| (2) AC_VI | 7 | 15 | 2 | 3.008 |
| (3) AC_VO | 3 | 7 | 2 | 1.504 |

☐ CAP
▨ EDCA TXOPs AND ACCESS BY LEGACY STAs USING DCF

SYSTEM AND METHOD FOR CONTROLLING THROUGHPUT OF ACCESS CLASSES IN A WLAN

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates generally to wireless local area networks, and more particularly provides a system and method for controlling throughput of access classes (ACs) in a wireless local area network (WLAN).

BACKGROUND

As users experience the convenience of wireless connectivity, they are demanding increasing support. Typical applications over wireless networks include video streaming, video conferencing, distance learning, etc. Because wireless bandwidth availability is restricted, quality of service (QoS) management is increasingly important in 802.11 networks.

The original 802.11 media access control (MAC) protocol was designed with two modes of communication for wireless stations (STAs). The first mode, Distributed Coordination Function (DCF), is based on Carrier Sense Multiple Access with Collision Avoidance (CSMA/CA), sometimes referred to as "listen before talk." A wireless station (STA) waits for a quiet period on the network and then begins to transmit data and detect collisions. The second mode, Point Coordination Function (PCF), supports time-sensitive traffic flows. Using PCF, wireless access points (APs) periodically send beacon frames to communicate network identification and management parameters specific to the wireless local area network (WLAN). Between beacon frames, PCF splits time into a contention period (CP) where the STAs implement a DCF protocol, and a contention-free period (CFP) where an AP coordinates access by the various STAs based on QoS requirements.

Because DCF and PCF do not differentiate between traffic types or sources, IEEE proposed enhancements to both coordination modes to facilitate QoS. These changes are intended to fulfill critical service requirements while maintaining backward-compatibility with current 802.11 standards.

Enhanced Distributed Channel Access (EDCA) introduces the concept of traffic categories (or access classes). Using EDCA, STAs try to send data after detecting that the wireless medium is idle for a set time period defined by the corresponding access class (AC). A higher-priority AC will have a shorter wait time than a lower-priority AC. While no guarantees of service are provided, EDCA establishes a probabilistic priority mechanism to allocate bandwidth based on ACs.

The IEEE 802.11e EDCA standard provides QoS differentiation by grouping traffic into four ACs, i.e., voice, video, best effort and background. Each transmission frame from the upper layers bears a priority value (0-7), which is passed down to the MAC layer. Based on the priority value, the transmission frames are mapped into the four ACs at the MAC layer. The voice (VO) AC has the highest priority; the video (VI) AC has the second highest priority; the best effort (BE) AC has the third highest priority; and the background (BK) AC has the lowest priority. Each AC has its own transmission queue and its own set of AC-sensitive medium access parameters. Traffic prioritization uses the medium access parameters—the arbitration interframe space (AIFS) interval, contention window (CW, CWmin and CWmax), and transmission opportunity (TXOP)—to ensure mat a higher priority AC has relatively more medium access opportunity than a lower priority AC.

Generally, in EDCA, AIFS is the time interval that a STA must sense the wireless medium to be idle before invoking a backoff mechanism or transmission. A higher priority AC uses a smaller AIFS interval. The contention window (CW, CWmin and CWmax) indicates the number of backoff time slots until the STA can attempt another transmission. The contention window is selected as a random backoff number of slots between 0 and CW. CW starts at CWmin. CW is essentially doubled every time a transmission fails until CW reaches its maximum value CWmax. Then, CW maintains this maximum value CWmax until the transmission exceeds a retry limit. A higher priority AC uses smaller CWmin and CWmax. A lower priority AC uses larger CWmin and CWmax. The TXOP indicates the maximum duration that an AC can be allowed to transmit frames after acquiring access to the medium. To save contention overhead, multiple transmission frames can be transmitted within one TXOP without additional contention, as long as the total transmission time does not exceed the TXOP duration.

To reduce the probability of two STAs colliding, because the two STAs cannot hear each other, the standard defines a virtual carrier sense mechanism. Before a STA initiates a transaction, the STA first transmits a short control frame called RTS (Request To Send), which includes the source address, the destination address and the duration of the upcoming transaction (i.e. the data frame and the respective ACK). Then, the destination STA responds (if the medium is free) with a responsive control frame called CTS (Clear to Send), which includes the same duration information. All STAs receiving either the RTS and/or the CTS set a virtual carrier sense indicator, i.e., the network allocation vector (NAV), for the given duration, and use the NAV together with the physical carrier sense when sensing the medium as idle or busy. This mechanism reduces the probability of a collision in the receiver area by a STA that is "hidden" from the transmitter STA to the short duration of the RTS transmission, because the STA hears the CTS and "reserves" the medium as busy until die end of the transaction. The duration information in the RTS also protects the transmitter area from collisions during the ACK from STAs that are out of range of the acknowledging STA. Due to the fact that the RTS and CTS are short, the mechanism reduces the overhead of collisions, since these transmission frames are recognized more quickly than if the whole data transmission frame was to be transmitted (assuming the data frame is bigger than RTS). The standard allows for short data transmission frames, i.e., those shorter than an RTS Threshold, to be transmitted without the RTS/CTS transaction.

With these medium access parameters, EDCA works in the following manner:

Before a transmitting STA can initiate any transmission, the transmitting STA must first sense the channel idle (physically and virtually) for at least an AIFS time interval. If the channel is idle after the initial AIFS interval, then the transmitting STA initiates an RTS transmission and awaits a CTS transmission from the receiving STA.

If a collision occurs during the RTS transmission or if CTS is not received, then the transmitting STA invokes a backoff procedure using a backoff counter to count down a random number of backoff time slots selected between 0 and CW (initially set to CWmin). The transmitting STA decrements the backoff counter by one as long as the channel is sensed to be idle. If the transmitting STA senses the channel to be busy at any time during the backoff procedure, the transmitting STA suspends its current backoff procedure and freezes its backoff counter until the channel is sensed to be idle for an AIFS interval again. Then, if the channel is still idle, the transmitting STA resumes decrementing its remaining backoff counter.

Once the backoff counter reaches zero, the transmitting STA initiates an RTS transmission and awaits a CTS transmission from the receiving STA. If a collision occurs during the RTS transmission or CTS is not received, then the transmitting STA invokes another backoff procedure, possibly increasing the size of CW. That is, as stated above, after each unsuccessful transmission, CW is essentially doubled until it reaches CWmax. After a successful transmission, CW returns to its default value of CWmin. During the transaction, the STA can initiate multiple frame transmissions without additional contention as long as the total transmission time does not exceed the TXOP duration.

The level of QoS control for each AC is determined by the combination of the medium access parameters and the number of competing STAs in the network. The default EDCA parameter values used by non-AP QoS stations (QSTAs) are identified in the table of FIG. 1. A TXOP_Limit value of 0 indicates that a single MAC service data unit (MSDU) or MAC protocol data unit (MPDU), in addition to a possible RTS/CTS exchange or CTS to itself, may be transmitted at any rate for each TXOP.

The Hybrid Coordination Function (HCF) is another 802.11e wireless protocol Generally, HCF uses the concepts of PCF, but substitutes the protocols of DCF during the contention period (CP) with the improved protocols of EDCA. Using HCF, a hybrid coordinator (HC), typically co-located with the AP, periodically sends beacon frames. Each beacon frame includes a beacon interval a timestamp, a service set identifier (SSID) identifying the specific wireless LAN, supported rates, parameter sets identifying implemented signaling protocols (frequency hopping spread spectrum, direct sequence spread spectrum, etc.), capability information identifying communication requirements (WEP, etc.), a traffic indication map (TIM) identifying data frames waiting in the AP's buffer, and a contention-free period (CFP) duration. The AP and STAs use the information in the beacon frames to implement HCF.

Between beacon frames, HCF splits time into a contention-free period (CFP) and a contention period (CP). During the CFP, the AP uses HCF controlled channel access (HCCA) protocols to coordinate access by the various STAs based on QoS requirements. The contention-free period (CFP) typically begins with the receipt of a beacon frame, and ends either upon expiration of the CFP duration, as specified in the beacon frame or upon receiving a CFP-End frame from the HC. During the CP, the AP and STAs use a combination of EDCA and HCCA protocols. Each STA accesses the wireless medium when the wireless medium is determined to be available under EDCA rules or when the STA receives a QoS CF-Poll frame from the HC. In other words, unlike PCF, HCF enables contention-free bursts called controlled access periods (CAPs) during the CP to allow priority traffic to access the wireless medium without contention. At all other times during the CP, the STAs access the wireless medium using EDCA, FIG. 1B is a timing diagram illustrating prior art CAP/CP/CFP intervals. As shown, a CFP Repetition interval includes both the CFP and CP.

Although IEEE 802.11e provides the means to achieve traffic-type differentiation, it does not specify a mechanism enabling throughput control across different ACs. Systems and method are needed to obtain throughput control across different ACs.

Example prior art references include the following:
1. U.S. Patent Application Publication No.: US 2005/0271019 A1 Publication Date: Dec. 8, 2005 application Ser. No. 10/861,258 Filing Date: Jun. 8, 2005 Title: ACCESS CONTROL AND PROTOCOL FOR PACKET SWITCHED WIRELESS COMMUNICATIONS NETWORKS
2. U.S. Patent Application Publication No.: US 2008/0045050 A1 Publication Date: Mar. 2, 2008 application Ser. No. 10/986,244 Filing Date: Nov. 10, 2004 Title: METHOD AND SYSTEM FOR A QUALITY OF SERVICE MECHANISM FOR A WIRELESS NETWORK
3. U.S. Patent Application Publication No.; US 2008/0187840 A1 Publication Date: Aug. 24, 2006 application Ser. No. 11/263,291 Filing Date: Oct. 31, 2005 Title: METHOD AND APPARATUS FOR CONTROLLING WIRELESS MEDIUM CONGESTION BY ADJUSTING CONTENTION WINDOW SIZE AND DISASSOCIATING SELECTED MOBILE STATIONS
4. U.S. Patent Application Publication No.: US 2006/0188301 A1 Publication Date: Sep. 7, 2006 application Ser. No. 11/074,359 Filing Date: Mar. 7, 2005 Title: PACKET-LEVEL SERVICE DIFFERENTIATION FOR QUALITY OF SERVICE PROVISIONING OVER WIRELESS LOCAL AREA NETWORKS
5. U.S. Patent Application Publication No.; US 2006/0291402 A1 Publication Date: Dec. 28, 2008 application Ser. No. 11/417,197 Filing Date; May 4, 2006 Title: APPARATUS AND METHOD FOR PROVIDING ENHANCED WIRELESS COMMUNICATIONS
6. PCT International Publication No.: WO 2008/130021 A2 Publication Date: Dec. 7, 2006 International Application No.: PCT/NO2006/000208 International Filing Date: Jun. 2, 2005 Title: METHOD AND DEVICE FOR ADMINISTRATION OF TRAFFIC IN COMMUNICATION SYSTEM USING A CONTENTION BASED ACCESS CONTROL

SUMMARY

In accordance with a first embodiment, the present invention provides a system comprising a monitoring module operative to monitor traffic on a wireless medium, the traffic belonging to one or more of two different access classes (ACs), one access class (AC) being a higher-priority AC and the other being a lower-priority AC; a throughput adaptation module communicatively coupled to the monitoring module and operative to dynamically generate data corresponding to one or more AC-sensitive parameters based on the monitored traffic and on a desired throughput ratio between the two different ACs; and a wireless communication module communicatively coupled to the throughput adaptation module and operative to communicate the data to one or more wireless stations on the wireless medium.

The monitoring module may determine dynamically the throughput requirements of the higher-priority traffic on the wireless medium. The monitoring module may determine dynamically the desired throughput ratio between the higher priority AC and the lower-priority AC. The two different traffic classes may include one for voice or video, and one for best effort or background. The system may be operative on the access point. The one or more AC-sensitive parameters may include at least one of AIFSN, TXOP and CWmin for at least one AC. The one or more AC-sensitive parameters may include AIFSN, which is computed based on the following equations;

$$AIFSN\_Lag = T1 + T2,$$

$$T1 = \frac{\log\left(\frac{N_1 + N_2}{N_1/k_i + N_2}\right)}{N_1 \log(1 - \tau)},$$

$$T2 = \frac{\log\left(\frac{1-\tau}{1-p\tau}\right)}{\log(1-\tau)},$$

$$p = \frac{1 - (1-\tau)^f}{\tau}, \text{ and}$$

$$A = AIFSN[HP] + D,$$

where N1 refers to the number of higher-priority AC streams, N2 refers to the number of lower-priority AC streams, 1:ki refers to the desired throughput ratio between the higher-priority AC and the lower-priority AC, τ refers to the steady state probability of channel access for the higher priority STAs, A refers to one of two AIFSN[LP] values, p refers to a probability of selecting value A as the AIFSN[LP] value, f refers to the fractional component of T1, D refers to the smallest integer greater than or equal to T1, and AIFSN_Lag refers to the difference between AIFSN[LP] and AIFSN[HP]. The one or more AC-sensitive parameters may include TXOP, which is computed based on the equation TXOP[LP]=TXOP[HP]×k, where 1:k refers to the desired throughput ratio between the higher-priority AC and the lower-priority AC. The one or more AC-sensitive parameters may include CWmin, which is computed based on the equation CWmin[LP]=CWmin[HP]/k, where 1:k refers to the desired throughput ratio between higher-priority AC and the lower-priority AC.

In accordance with another embodiment, the present invention may provide a method comprising monitoring traffic on a wireless medium, the traffic belonging to one or more of two different access classes (ACs), one access class (AC) being a higher-priority AC and the other being a lower-priority AC; dynamically generating data corresponding to one or more AC-sensitive parameters based on the monitored traffic and on a desired throughput ratio between the two different ACs; and communicating the data to one or more wireless stations on the wireless medium.

The method may further comprise determining dynamically the throughput requirements of the higher-priority traffic on the wireless medium. The method may further comprise determining dynamically the desired throughput ratio between the higher priority AC and the lower-priority AC. The two different traffic classes may include one for voice or video, and one for best effort or background. The method may be operative on the access point. The one or more AC-sensitive parameters include at least one of AIFSN, TXOP and CWmin for at least one AC. The one or more AC-sensitive parameters may include AIFSN, and the method may further comprise computing the following equations:

$$AIFSN\_Lag = T1 + T2,$$

$$T1 = \frac{\log\left(\frac{N_1 + N_2}{N_1/k_i + N_2}\right)}{N_1 \log(1 - \tau)},$$

$$T2 = \frac{\log\left(\frac{1-\tau}{1-p\tau}\right)}{\log(1-\tau)},$$

$$p = \frac{1 - (1-\tau)^f}{\tau}, \text{ and}$$

$$A = AIFSN[HP] + D,$$

where N1 refers to the number of higher-priority AC streams, N2 refers to the number of lower-priority AC streams, 1:ki refers to the desired throughput ratio between the higher-priority AC and the lower-priority AC, τ refers to the steady state probability of channel access for higher priority STAs, A refers to one of two AIFSN[LP] values, p refers to a probability of selecting value A as the AIFSN[LP] value, f refers to the fractional component of T1, D refers the smallest integer greater than or equal to T1, and AIFSN_Lag refers to the difference between AIFSN[LP] and AIFSN[HP]. The one or more AC-sensitive parameters may include TXOP, and the method may further comprise computing TXOP[LP]=TXOP[HP]×k, where 1:k refers to tire desired throughput ratio between the higher-priority AC and the lower-priority AC. The one or more AC-sensitive parameters may include CWmin, and the method may further comprise computing CWmin[LP]=CWmin[HP]/k, where 1:k refers to the desired throughput ratio between higher-priority AC and the lower-priority AC.

In accordance with yet another embodiment, the present invention may provide a system comprising means for monitoring traffic on a wireless medium, the traffic belonging to one or more of two different access classes (ACs), one access class (AC) being a higher-priority AC and the other being a lower-priority AC; means for dynamically generating data corresponding to one or more AC-sensitive parameters based on the monitored traffic and on a desired throughput ratio between the two different ACs; and means for communicating the data to one or more wireless stations on the wireless medium.

DETAILED DESCRIPTION

The following description is provided to enable any person skilled in the art to make and use the invention, and is provided in the context of a particular application and its requirements. Various modifications to the embodiments are possible to those skilled in the art, and the generic principles defined herein may be applied to these and other embodiments and applications without departing from the spirit and scope of the invention. Thus, the present invention is not intended to be limited to the embodiments shown, but is to be accorded the widest scope consistent, with the principles, features and teachings disclosed herein.

In one embodiment, the access point (AP) implements an algorithm to tune the EDCA parameters across different ACs to achieve desired throughput ratios. More specifically, the AP monitors the throughput requirements of high priority traffic and then tunes the EDCA parameters across different ACs relative to the high priority traffic to optimize available bandwidth and achieve desired throughput ratios.

Figures 1A, 1B:
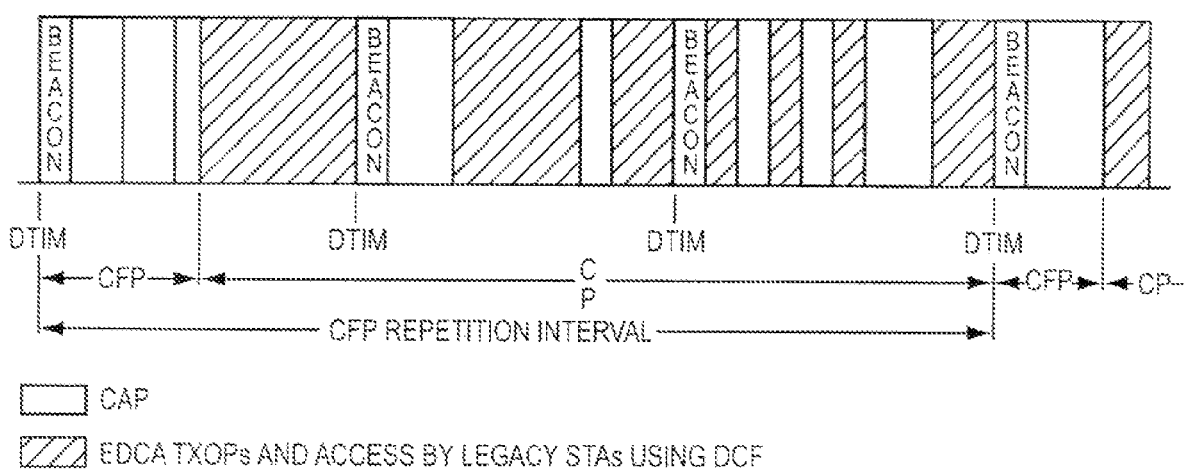
FIG. 1A is a table of a prior art EDCA access class (AC) parameter set for 802.11g.
FIG. 1B is a timing diagram illustrating prior art CP/CFP intervals.
Figure 2A:
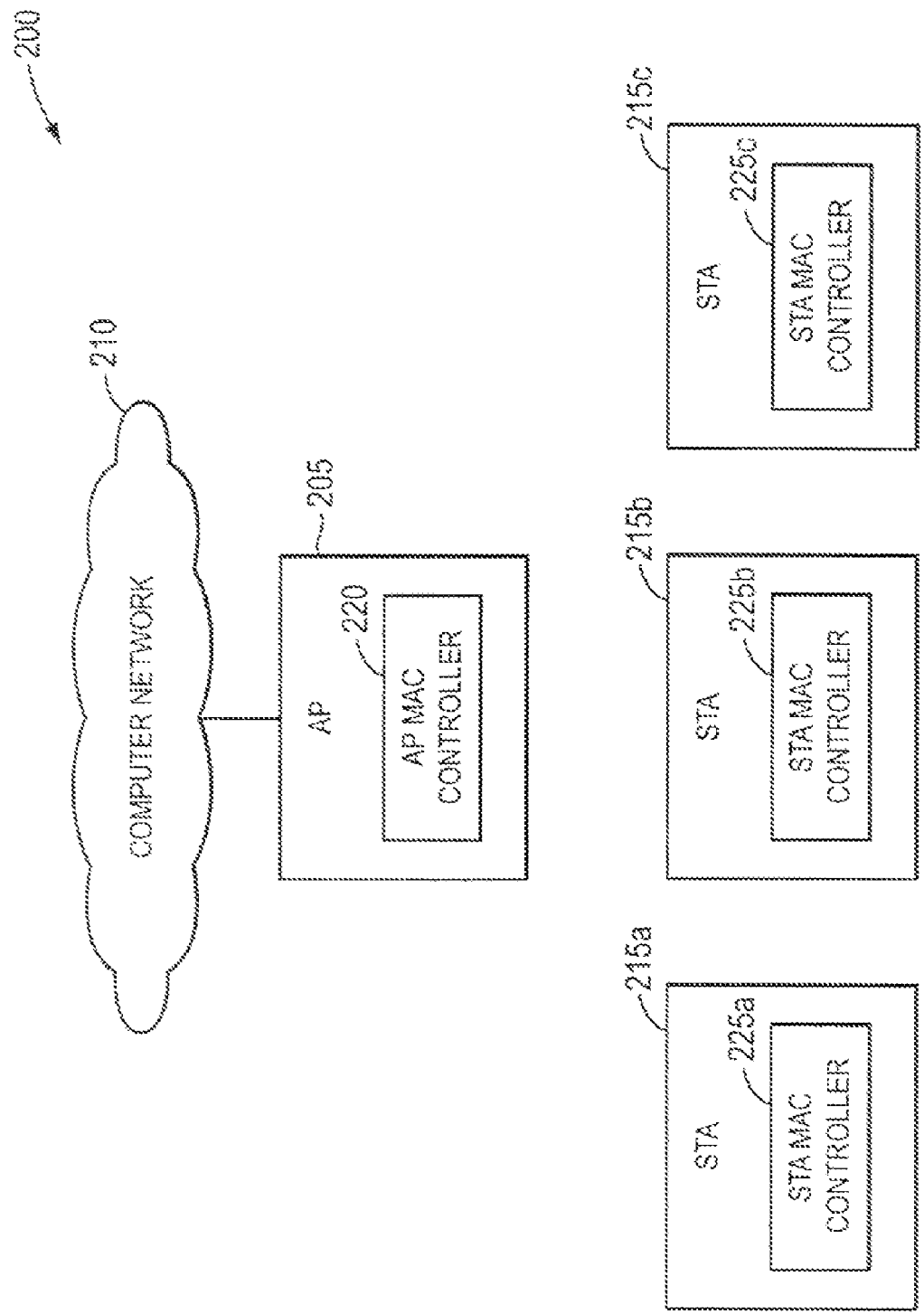
FIG. 2A is a block diagram illustrating a wireless local area network (WLAN) using throughput tuning, in accordance with an embodiment of the present invention.

FIG. 2A is a block diagram illustrating a wireless local area network (WLAN) 200 using throughput tuning in accordance with an embodiment of the present invention. The WLAN 200 includes an AP 205 coupled to a computer network 210, such as the wide area network (WAN) commonly referred to as the Internet. In one embodiment, the AP 205 is coupled to the computer network 210 via a wired connection, although a wireless connection is also possible. The WLAN 200 also includes three (3) STAs, namely, STA 215a, STA 215b and STA 215c (although any number of STAs is possible). Each STA 215a, 215b, 215c is in wireless communication with the AP 205 via the wireless medium. Each STA 215a, 215b, 215c is generally referred to herein as a STA 215, although each STA 215a, 215b, 215c need not be identical.

The AP 205 includes an AP medium access control (MAC) controller 220, which includes hardware, software and/or firmware operative to control wireless access to the wireless medium by the AP 205 and to control throughput tuning. Details of the AP 205 are provided with reference to FIG. 3. Details of the AP MAC controller 220 are provided with reference to FIG. 4A.

The STA 215a includes a STA MAC controller 225a; the STA 215b includes a STA MAC controller 225b; and the STA 215c includes a STA MAC controller 225c. Each STA MAC controller 225a, 225b, 225c is generally referred to herein as a STA MAC controller 225, although each STA MAC controller 225a, 225b, 225c need not be identical. Each STA MAC controller 225 includes hardware, software and/or firmware to control wireless access to the wireless medium by each STAs 215.

In one embodiment, the AP MAC controller 220 effects throughput tuning by monitoring the throughput requirements of high priority traffic of registered. STAs 215 and modifying one or more of the EDCA parameters to achieve desired throughput ratios across different ACs relative to the throughput requirements of the high priority traffic. The AP MAC controller 220 broadcasts the EDCA parameters in beacon frames to the STAs 215.

Figure 2B:
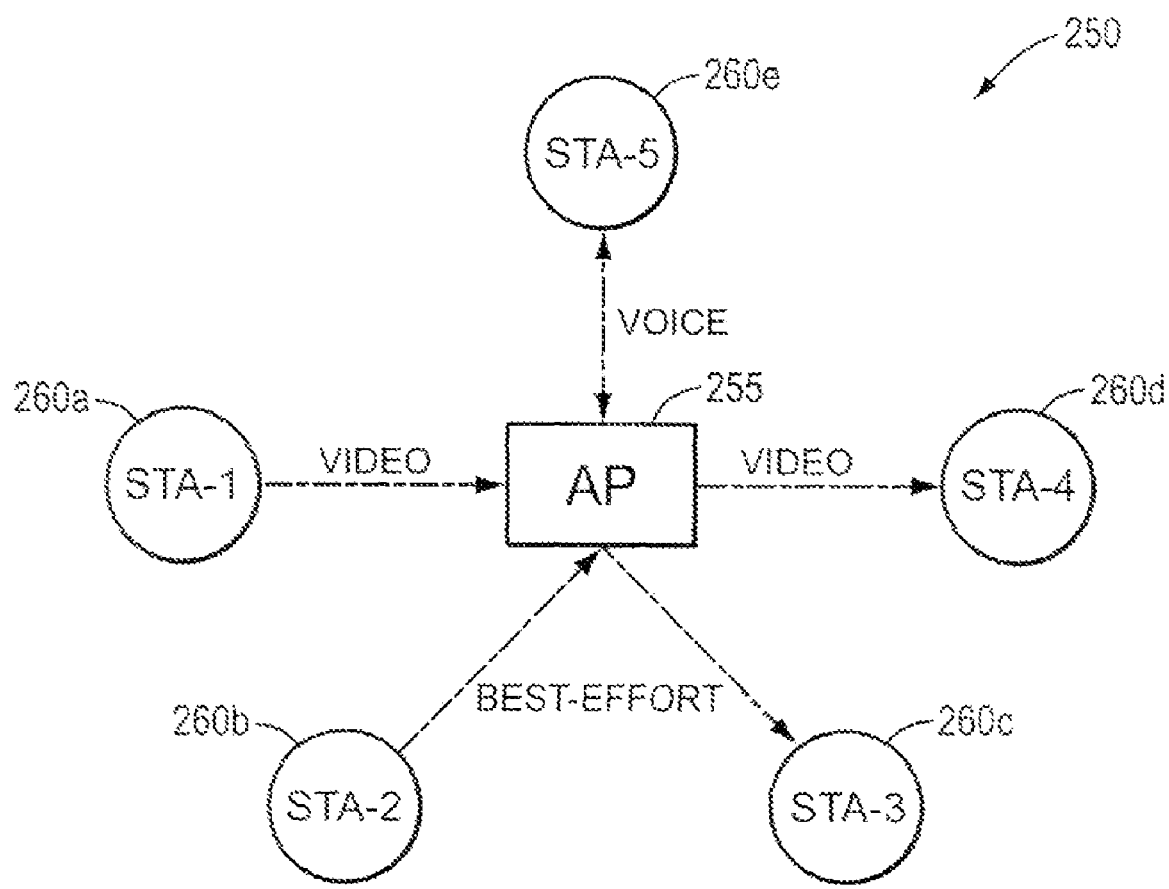
FIG. 2B is a block diagram illustrating details of a WLAN with traffic categories listed, in accordance with an embodiment of the present invention.

FIG. 2B is a block diagram illustrating details of a WLAN 250 with traffic categories listed. In accordance with an embodiment of the present invention. As shown, The WLAN 250 includes an AP 255 and source and sink STAs 260a-260e. As shown, STA 260a is a video source station; STA 260b is a best-effort source station; STA 260c is a best-effort sink station; STA 260d is a video sink station; and STA 260e is a source and sink voice station. Each STA MAC controller 260a, 260b, 260c, 260d, 260e is generally referred to herein as a STA MAC controller 260, although each STA MAC controller 260a, 260b, 260c, 260d, 260e need not be identical.

Figure 3:
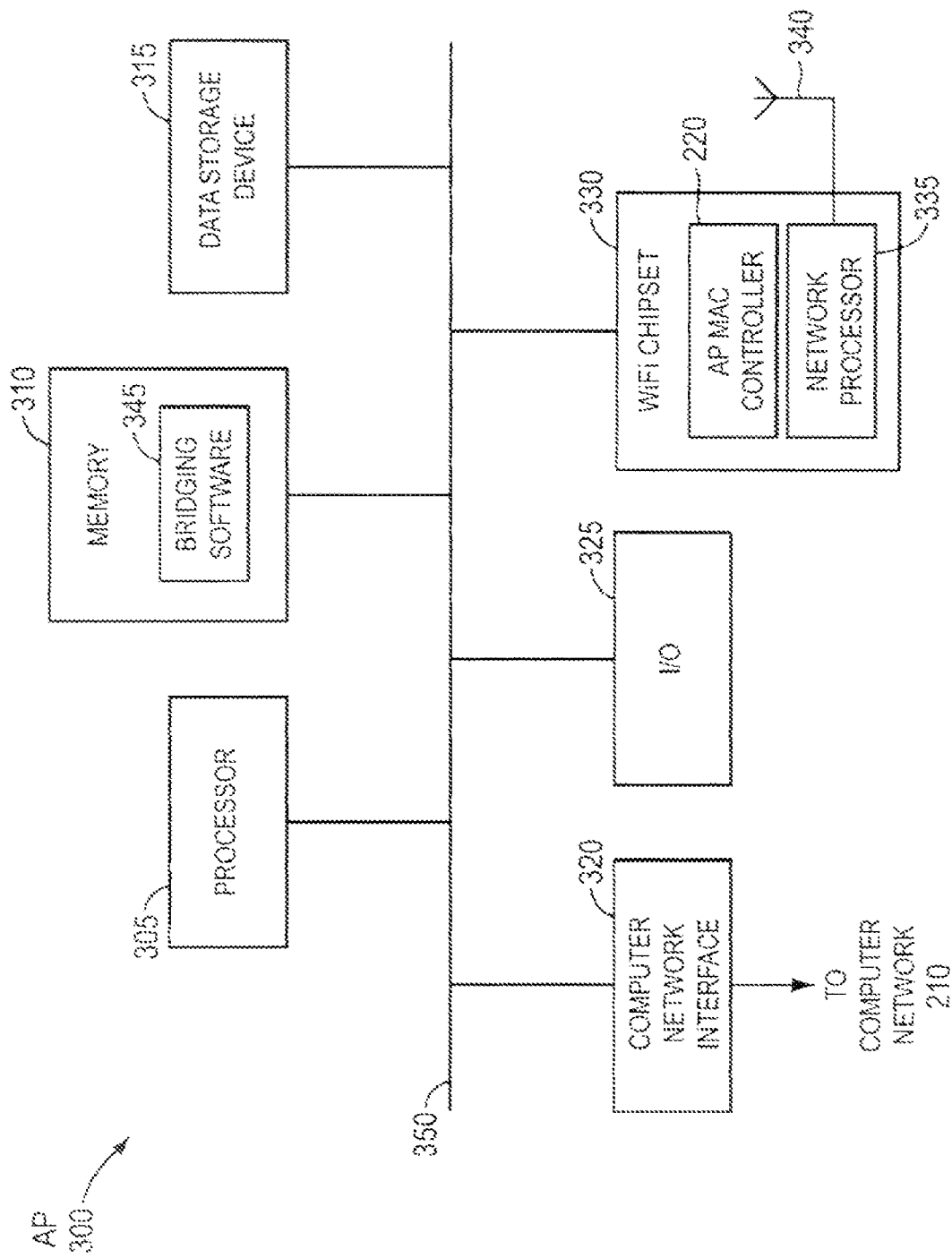
FIG. 3 is a block diagram illustrating details of an AP of FIG. 2A, in accordance, with an embodiment of the present invention.

FIG. 3 is a block diagram illustrating details of an AP 300 (e.g., AP 205 or AP 255), in accordance with an embodiment of the present invention. The AP 300 includes a processor 305 (such as an Intel Pentium® microprocessor or a Motorola Power PC® microprocessor), memory 310 (such as random-access memory), a data storage device 315 (such as a magnetic disk), a computer network interlace 320, input/output (I/O) 325 (such as a keyboard, mouse and LCD display), and a WiFi chipset 330, each coupled to the communication channel 350. The computer network interface 320 may be coupled to the computer network 210. One skilled in the art will recognize that, although the memory 310 and the data storage device 315 are illustrated as different units, the memory 310 and the data storage device 315 can be parts of the same unit, distributed units, virtual memory, etc. The term "memory" herein is intended to cover all data storage media whether permanent or temporary.

The memory 310 stores bridging software 345 that enables communications between the WiFi chipset 330 and the computer network interface 320. The WiFi chipset 330 contains the AP MAC controller 220 and a network processor 335 coupled to a wireless antenna 340. Details of the AP MAC controller 220 are described below with reference to FIG. 4A.

Figure 4A:
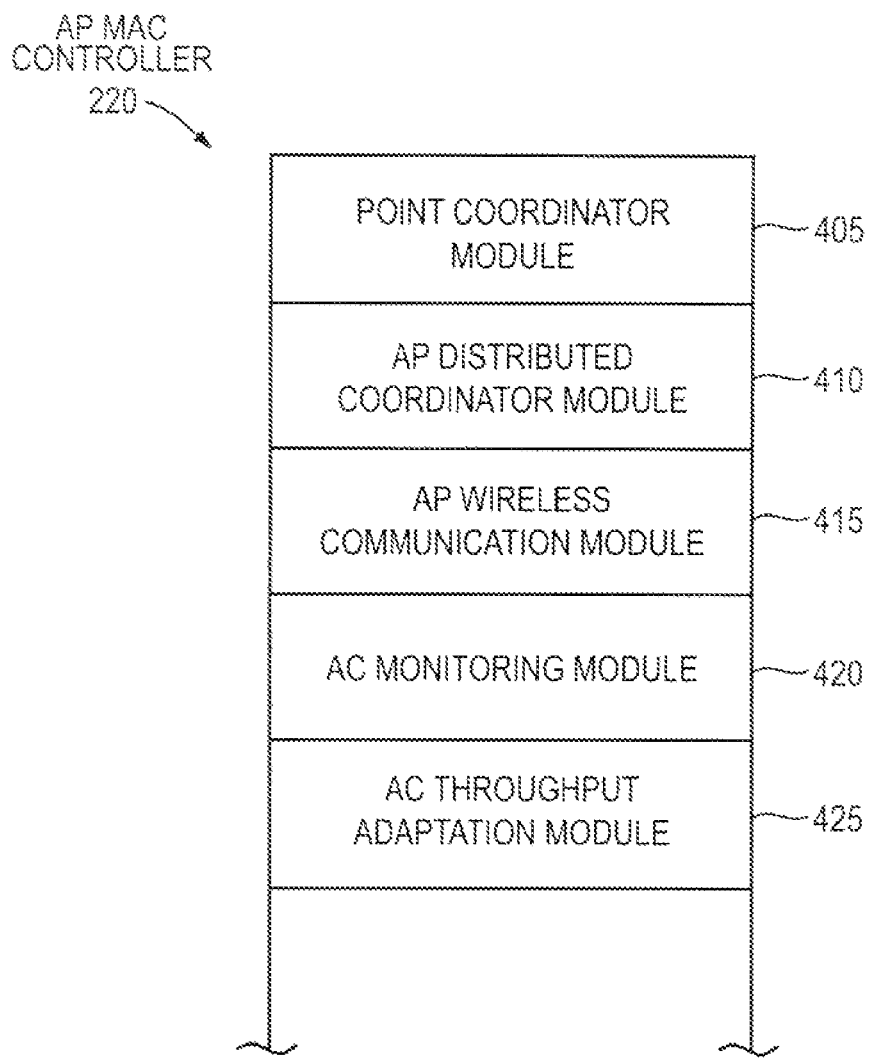
FIG. 4A is a block diagram illustrating details of an AP MAC controller of FIG. 3, in accordance with an embodiment of the present invention.

FIG. 4A is a block diagram illustrating details of an AP MAC controller 220, in accordance with an embodiment of the present invention. The AP MAC controller 220 includes a point coordinator module 405, an AP distributed coordinator module 410, an AP wireless medium communication module 415, an AC monitoring module 420, and an AC throughput adaptation module 425.

The point coordinator module 405 includes hardware, software and/or firmware that enables access to the wireless medium during the contention-free period (CFP) using point coordinated access.

The AP distributed coordinator module 420 includes hardware, software and/or firmware that enables access to the wireless medium during the contention period (CP) using AC-sensitive distributed access, e.g., EDCA mode. The AP distributed coordinator module 420 forwards the AC-sensitive distributed access parameters to the STAs 215 in beacon frames.

The AP wireless medium communication module 425 includes hardware, software and/or firmware that receives transmission frames from the point coordinator module 415 and/or the AP distributed coordinator module 420 and transfers the transmission packets to the network processor 335 for transmission by the wireless antenna 340.

It will be appreciated that during the initialization state, all STAs 215 register with the AP 205. Thus, in one embodiment, the AC monitoring module 420 reads the source address of MAC packets for any transmission of any registered STA 215 to determine the traffic type (i.e., the corresponding AC) and its data rate. The AC monitoring module 420 may determine the corresponding AC by observing the duration of the channel busy state, which is limited by the TXOP parameter. The AC monitoring module 420 may estimate data rate by computing the average number of packets transmitted per unit time. By monitoring AC and data rates of the registered STAs 215, the AC monitoring module 420 can determine the throughput requirements of the high priority traffic, e.g., VI traffic and/or VO traffic, of the registered STAs 215. For example, IEEE 802.11g provides 54 Mbps in the physical layer, and about 30 Mbps (or 60% of 54 Mbps) in the MAC layer. If VI traffic requires about 20 Mbps (and assuming VO traffic is negligible relative to VI traffic), then in one embodiment the AC monitoring module 420 assigns the remaining 10 Mbps to BE and/or BK traffic, if there is no VI traffic at a given time, the AC monitoring module 420 may or may not reserve bandwidth, until such time that VI traffic is sent on the wireless medium.

The AC throughput adaptation module 425 computes desired throughput ratios for the lower priority traffic, e.g., best-effort (BE) and background (Bk), relative to the high priority traffic, e.g., voice (VO) and/or video (VI). For example, if VI traffic is using 20 Mbps of a total possible 30 Mbps, then 10 Mbps can be assigned to BE and/or BK traffic. In one embodiment, the AC throughput adaptation module 425 may assign 8 Mbps to BE traffic and 2 Mbps to BK traffic. Thus, the ratio of BE traffic relative to VI traffic would be 8/20 or 0.4; and the ratio of BK traffic relative to VI traffic would be 2/20 or 0.1.

Once the desired throughput ratios of high priority traffic are known, the AC throughput adaptation module 425 tunes one or more of the AC-sensitive contention-based (e.g., EDCA) parameters (e.g., CWmin, CWmax, AIFSN and/or TXOP) across different ACs to allocate the remaining bandwidth to the low priority traffic. For example, in one embodiment, to achieve a throughput ratio 1:k across two ACs, namely, across high priority access class AC[HP] and lower priority access class AC[LP], the AC throughput adaptation module 425 may modify only one AC-sensitive contention-based parameter across the ACs, while maintaining the other AC-sensitive contention-based parameters as identical to each other. One skilled in the art will recognize that embodiments may be developed to adjust AIFSN, CWmin, CWmax, TXOP and/or combinations of these parameters in various other manners. Four example embodiments are described below.

Figure 4B:
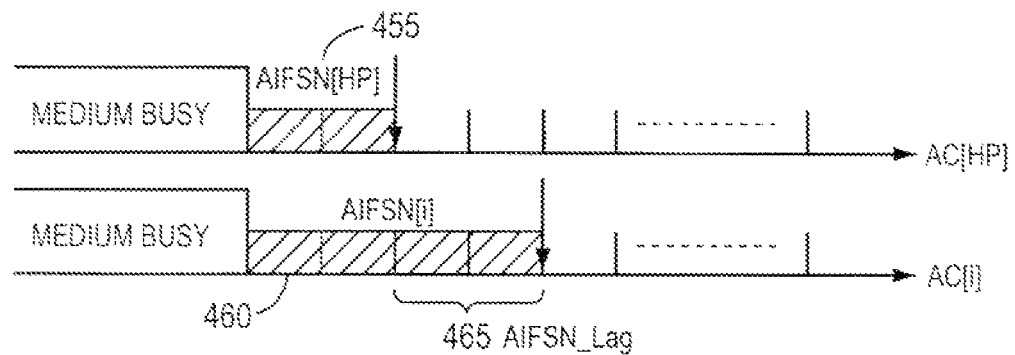
FIG. 4B is a timing diagram illustrating AIFSN differentiation in EDCA.

1. Adjusting AIFSN: If AC[HP] and AC[LP] have identical CWmin, CWmax and TXOP values, then the AC throughput adaptation module 425 can achieve a desired throughput ratio of 1:k by adjusting AIFSN[LP] relative to a predetermined AIFSN[HP] as described below:

To achieve the desired throughput ratios across different ACs, the AC throughput adaptation module 425 in one embodiment uses the AIFSN[HP] of AC[HP] as a baseline to determine the AIFSN[i] for lower priority AC[i]. That is, between AC[HP] and each AC[i], the AC throughput adaptation module 425 assumes a desired throughput ratio of 1:$k_i$. For example, AC[VO] may be ignored and left with its default 802.11g values. Further, when compared to the throughput requirements of AC[VI], $k_i$ for AC[BE] may be 0.4, and $k_i$ for AC[BK] may be 0.2. Further, as shown in FIG. 4B, the AC throughput adaptation module 425 defines AIFSN[HP] 455 as the corresponding AIFSN value for AC[HP], AIFSN[i] 460 as the corresponding AIFSN value for AC[i], and AIFSN_Lag[i] 465 as the difference between AIFSN[i] 460 and AIFSN[HP] 455, i.e., AIFSN_Lag[i]=AIFSN[i]−AIFSN[HP].

If there are $N_1$ STAs 215 belonging to AC[HP] and $N_2$ STAs 215 belonging to AC[i], then the AP 205 throughput adaptation module 425 may apply the following relationship:

$$(1-\tau)^{N_1 \times \text{AIFSN\_Lag}[i]} = \frac{N_1 + N_2}{N_1/k_i + N_2} \qquad (1)$$

where $\tau$ is the steady state probability of channel access for higher priority STAs computed for example as $\tau=2/(1+\text{CWmin}[HP])$. Accordingly, the AC throughput adaptation module 425 computes AIFSN_Lag[i] in the following manner:

$$\text{AIFSN\_Lag}[i] = \frac{\log\left(\frac{N_1+N_2}{N_1/k_i+N_2}\right)}{N_1 \log(1-\tau)} \qquad (2)$$

Since the above expression does not guarantee an integer value for AIFSN_Lag[i], the AC throughput adaptation module 425 considers a random AIFSN[i] mechanism for STAs 215 with AC[i] (according to a predetermined probability density function) and a fixed AIFSN[HP] value for STAs with AC[HP].

To effect the probability density function for STAs 215 with AC[i], the AC throughput adaptation module 425 assumes AC[i] STAs 215 choose AIFSN[i] value A with probability p and value A−1 with probability 1−p. Accordingly, the expression for AIFSN_Lag[i]=AIFSN[i]−AIFSN[HP] can be rewritten as:

$$\text{AIFSN\_Lag}[i] = T1 + T2 \qquad (3)$$

where, $$T1 = \frac{\log\left(\frac{N_1+N_2}{N_1/k_i+N_2}\right)}{N_1 \log(1-\tau)} \qquad (3a)$$

$$T2 = \frac{\log\left(\frac{1-\tau}{1-p\tau}\right)}{\log(1-\tau)} \qquad (3b)$$

The AC throughput adaptation module 425 uses a value p such that the resulting expression in (3) becomes an integer. Thus, p is a solution to the equation T2=1−frac(T1), where frac denotes the fractional part of its argument. Letting f=frac(T1), then $$p = \frac{1-(1-\tau)^f}{\tau} \qquad (4)$$

Using the power series expansion, it can be shown that p≈f for $\tau \ll 1$ (e.g., $\tau=0.2$). Therefore, $$\left. \begin{array}{l} D = \lceil T1 \rceil \\ A = AIFSN[HP] + D \end{array} \right\} \qquad (5)$$

where $\lceil T1 \rceil$ denotes the smallest integer greater than, or equal to T1.

For example, assuming:
  $\text{CWmin}_{HP}=\text{CWmin}_{LP}=15$, $\text{CWmax}_{HP}=\text{CWmax}_{LP}=31$;
  N1=N2=2; and
  $k_i=0.5$, AIFSN[HP]=2;
using Eqs (3), (4) and (5) gives:
  p=0.5349, D=2;
  A=AIFSN[HP]+D=4; and AIFSN[LP]=4 with, probability 0.5349 and 3 with probability 0.4651.

2. Tuning using CWmin: If AC[HP] and AC[LP] have identical TXOP and AIFSN values, the AC throughput adaptation module 425 can achieve a ratio of 1:k by adjusting CWmin of AC[LP] according to CWmin[LP]=integer(CWmin[HP]/k). If according to 802.11e, CWmin must be based on a particular formula, e.g., $2^n-1$, then CWmin[LP] may be chosen as a value within $2^n-1$ and nearest to integer(CWmin[HP]/k).

3. Tuning using TXOP: If AC[HP] and AC[LP] have identical CWmin and AIFSN values, the AC throughput adaptation module 425 can achieve a ratio of 1:k by adjusting TXOP of AC[LP] according to TXOP[LP]=TXOP[HP]×k.

4. Tuning using TXOP, CWmin and AIFSN: If AC[HF] and AC[LP] have different sets of EDCA parameter values, the AC throughput adaptation module 425 can achieve a desired throughput ratio of 1:k between AC[HP] and AC[LP] by applying the following equations;
   a. Compute k_sub as:
      i. k_sub={TXOP[LP]/TXOP[HP]}×{CWmin[HP]/CWmin[LP]}
   b. Compute k_rem as:
      i. k_rem=k/k_sub
   c. Compute the parameters D, p and A using Eqs (3), (4) and (5) above but modified as follows:
      i. Compute τ using CWmin[HP] as: τ=2/(CWmin[HP]+1); and
      ii. Substitute the value k_rem for k.

Embodiments of the invention regulate throughput rates allocated to each AC, leading to better management of QoS and admission control for WLAN and mesh networks.

Figure 5:
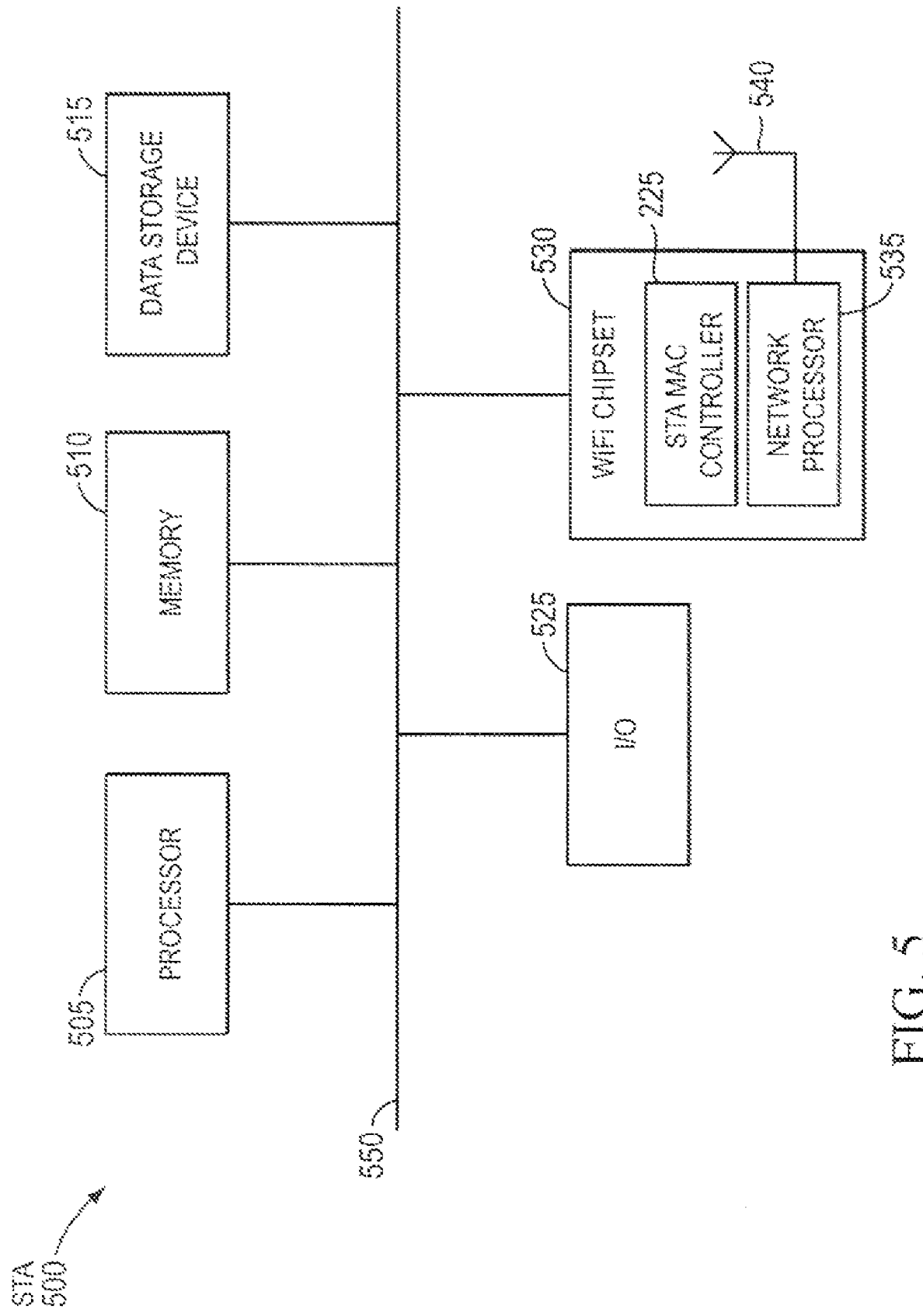
FIG. 5 is a block diagram illustrating details of a STA of FIG. 2A, in accordance with an embodiment of the present invention.

FIG. 5 is a block diagram illustrating details of a STA 500 (e.g., STA 215 or STA 260), in accordance with an embodiment of the present invention. The STA 500 includes a processor 505 (such as an Intel Pentium® microprocessor or a Motorola Power PC® microprocessor), memory 510 (such as random-access memory), a data storage device 515 (such as a magnetic disk), input/output (I/O) 525 (such as a keyboard, mouse and LCD display), and a WiFi chipset 530, each coupled to the communication channel 550. One skilled in the art will recognize that, although the memory 510 and the data storage device 515 are illustrated as different units, the memory 510 and the data storage device 515 can be parts of the same unit, distributed units, virtual memory, etc. The term "memory" herein is intended to cover all data storage media whether permanent or temporary.

The WiFi chipset 530 contains the STA MAC controller 225 and a network processor 535 coupled to a wireless antenna 540. Details of the STA MAC controller 225 are described below with reference to FIG. 6.

Figure 6:
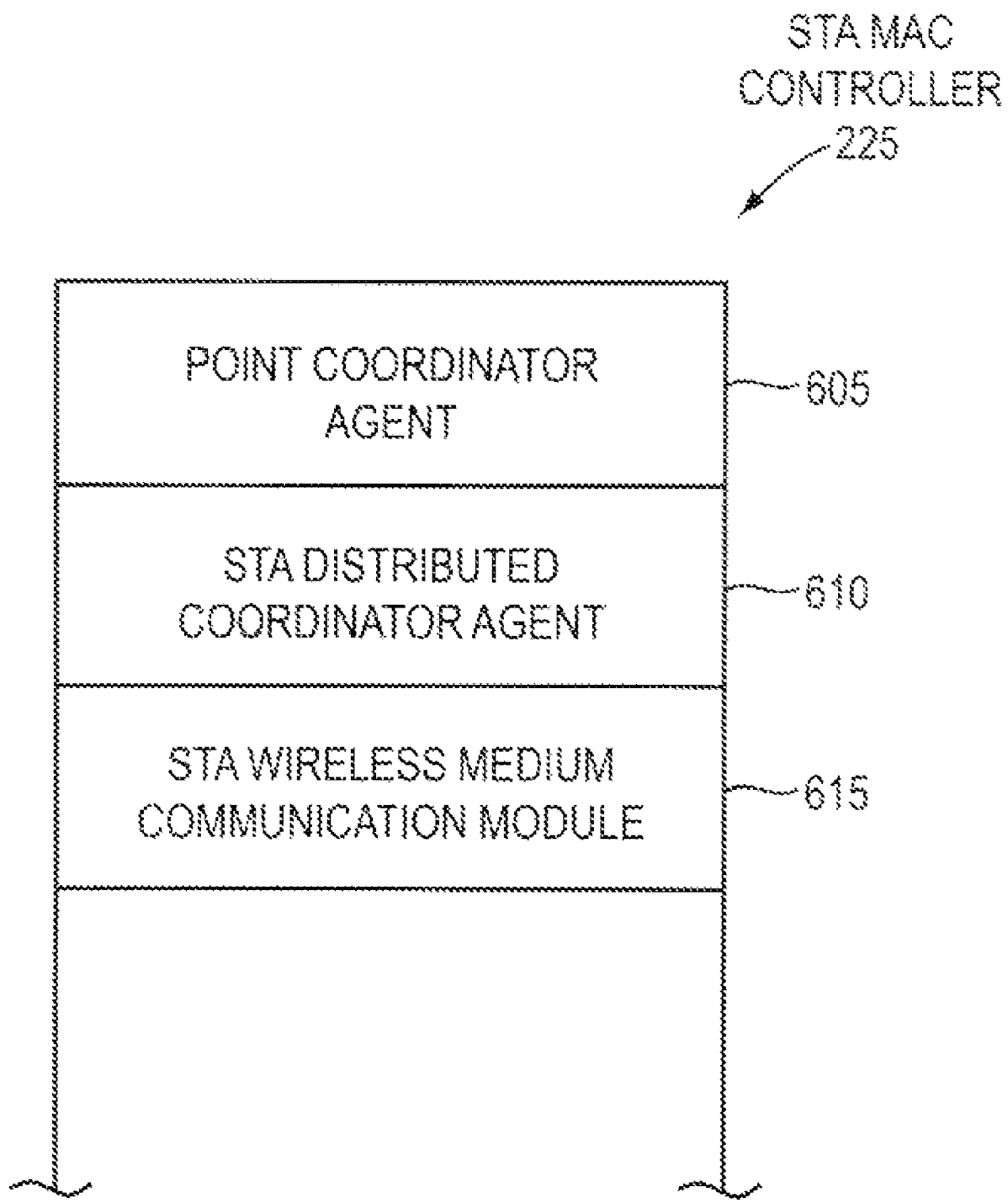
FIG. 6 is a block diagram illustrating details of a STA MAC controller of FIG. 5, in accordance with an embodiment of the present invention.

FIG. 6 is a block diagram illustrating details of a STA MAC controller 225, in accordance with an embodiment of the present invention. The STA MAC controller 225 includes a point coordinator agent 605, a STA distributed coordinator module 610, and a STA wireless medium communication module 615.

The point coordinator agent 615 includes hardware, software and/or firmware that enables access to the wireless medium during the CFP using point coordinated access.

The STA distributed coordinator module 620 includes hardware, software and/or firmware that enables access to the wireless medium during the CP using EDCA mode. The STA distributed coordinator module 620 receives the EDCA parameters from the AP 205/255 typically in a beacon frame, and uses the EDCA parameters to effect EDCA-based distributed coordinated access to the wireless medium.

The STA wireless medium communication module 625 includes hardware, software and/or firmware that receives transmission frames from the point coordinator agent 615 and/or the STA distributed coordinator module 620 and transfers the transmission packets to the network processor 535 for transmission on the wireless antenna 540.

Figure 7:
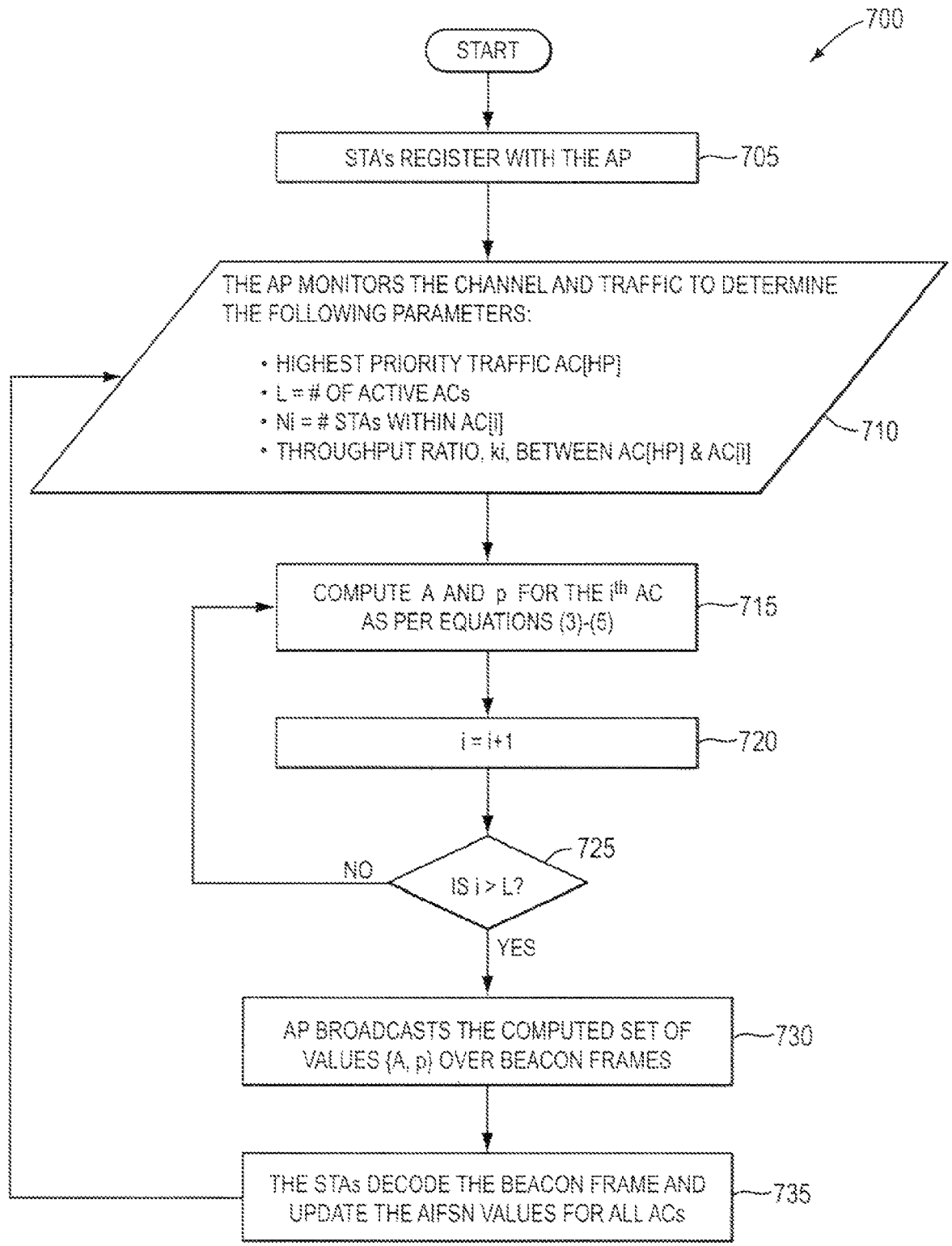
FIG. 7 is a flowchart illustrating a method of tuning throughput across traffic classes, in accordance with an embodiment of the present invention.

FIG. 7 is a flowchart illustrating a method 700 of tuning throughput across ACs, in accordance with an embodiment of the present invention. Method 700 begins with the STAs 215 in step 705 registering with the AP 205. The AP 205 in step 710 monitors the channel and traffic to determine the following traffic parameters:
- highest priority traffic AC[HP];
- the number L of active ACs;
- the number Ni of STAs within AC[i]; and
- the throughput ratio ki between AC[HP] and AC[i].

For AC[i], the AP 205 in step 715 computes the AIFSN values A, with its probability of access p, and A-1, with its probability of access 1-p, per equations (3)-(5) above. The AP 205 in step 720 increments for the next AC[i], and in step 725 determines whether all AC[I] have been managed. If not, then the AP 205 returns to step 715 to compute AIFSN values and probabilities of access for the next AC[i]. If so, then the AP 205 in step 730 broadcasts the computed set of AC-sensitive contention-based parameters over beacon frames. In another embodiment, the AP 205 in step 730 may broadcast a set of A and p values, which the STAs 215 use to compute the AC-sensitive contention-based parameters. The STAs 215 in step 735 receive the beacon frames and update the AC-sensitive contention-based parameters accordingly. Method 700 then returns to step 710 to continue monitoring the channel and traffic to determine whether the traffic parameters have changed, such that if changed perhaps more than a predetermined difference the AP 205 can adjust the A and p values and/or AC-sensitive contention-based parameters.

The foregoing description of the preferred embodiments of the present invention is by way of example only, and other variations and modifications of the above-described embodiments and methods are possible in light of the foregoing teaching. Although the network sites are being described as separate and distinct sites, one skilled in the art will recognize that these sites may be a part of an integral site, may each include portions of multiple sites, or may include combinations of single and multiple sites. The various embodiments set forth herein may be implemented utilizing hardware, software, or any desired combination thereof. For that matter, any type of logic may be utilized which is capable of implementing the various functionality set forth herein. Components may be implemented using a programmed general-purpose digital computer, using application specific integrated circuits, or using a network of interconnected conventional components and circuits. Connections may be wired, wireless, modem, etc. The embodiments described herein are not intended to be exhaustive or limiting. The present invention is limited only by the following claims.

The invention claimed is:

1. A system comprising:
   a monitoring module operative to monitor traffic on a wireless medium, the traffic belonging to one or more of two different access classes (ACs), one access class (AC) being a higher-priority AC and the other being a lower-priority AC;
   a throughput adaptation module communicatively coupled to the monitoring module and operative to dynamically generate data corresponding to one or more AC-sensitive parameters based on the monitored traffic and on a desired throughput ratio between the two different ACs; and a wireless communication module communicatively coupled to the throughput adaptation module and operative to communicate the data to one or more wireless stations on the wireless medium, wherein the one or more AC-sensitive parameters includes AIFSN, which is computed based on the following equations:

$$AIFSN\_Lag = T1 + T2,$$

$$T1 = \frac{\log\left(\frac{N_1 + N_2}{N_1/k_j + N_2}\right)}{N_1 \log(1-\tau)},$$

$$T2 = \frac{\log\left(\frac{1-\tau}{1-p\tau}\right)}{\log(1-\tau)},$$

$$p = \frac{1-(1-\tau)^f}{\tau}, \text{ and}$$

$$A = AIFSN[HP] + D$$

where N1 refers to the number of higher-priority AC streams, N2 refers to the number of lower-priority AC streams, 1:ki refers to the desired throughput ratio between the higher-priority AC and the lower-priority AC, τ refers to the steady state probability of channel access for the higher priority stations, A refers to one of two AIFSN[LP] values, p refers to a probability of selecting value A as the AIFSN[LP] value, f refers to the fractional component of T1, D refers to the smallest integer greater than or equal to T1, and AIFSN_Lag refers to the difference between AIFSN[LP] and AIFSN[HP].

2. The system of claim 1, wherein the monitoring module determines dynamically the throughput requirements of the higher-priority traffic on the wireless medium.

3. The system of claim 2, wherein the monitoring module determines dynamically the desired throughput ratio between the higher priority AC and the lower-priority AC.

4. The system of claim 1, wherein the two different traffic classes include one for voice or video, and one for best effort or background.

5. The system of claim 1, wherein the system is operative on the access point.

6. The system of claim 1, wherein the one or more AC-sensitive parameters include at least one of AIFSN, TXOP and CWmin for at least one AC.

7. The system of claim 1, wherein the one or more AC-sensitive parameters includes TXOP, which is computed based on the equation TXOP[LP]=TXOP[HP]×k, where 1:k refers to the desired throughput ratio between the higher-priority AC and the lower-priority AC.

8. The systems of claim 1, wherein the one or more AC-sensitive parameters includes CWmin, which is computed based on the equation CWmin[LP]=CWmin[HP]/k, where 1:k refers to the desired throughput ratio between higher-priority AC and the lower-priority AC.

9. The system of claim 1, wherein the wireless communication module communicates the data by using the sensitive parameters AIFSN[LP] set the value A with probability p and AIFSN[LP] set the value A-1 with probability 1−p.

10. A method comprising:

monitoring traffic on a wireless medium, the traffic belonging to one or more of two different access classes (ACs), one access class (AC) being a higher-priority AC and the other being a lower-priority AC;

dynamically generating data corresponding to one or more AC-sensitive parameters based on the monitored traffic and on a desired throughput ratio between the two different ACs; and communicating the data to one or more wireless stations on the wireless medium, wherein the one or more AC-sensitive parameters includes AIFSN, and further comprising computing the following equations:

$$AIFSN\_Lag = T1 + T2,$$

$$AIFSN\_Lag = T1 + T2,$$

$$T1 = \frac{\log\left(\frac{N_1 + N_2}{N_1/k_i + N_2}\right)}{N_1 \log(1-\tau)},$$

$$T2 = \frac{\log\left(\frac{1-\tau}{1-p\tau}\right)}{\log(1-\tau)},$$

$$p = \frac{1-(1-\tau)^f}{\tau}, \text{ and}$$

$$A = AIFSN[HP] + D,$$

where N1 refers to the number of higher-priority AC streams, N2 refers to the number of lower-priority AC streams, 1:ki refers to the desired throughput ratio between the higher-priority AC and the lower-priority AC, τ refers to the steady state probability of channel access for higher priority stations. A refers to one of two AIFSN[LP] values, p refers to a probability of selecting value A as the AIFSN[LP] value, f refers to the fractional component of T1, D refers to the smallest integer greater than or equal to T1, and AIFSN_Lag refers to the difference between AIFSN[LP] and AIFSN[HP].

11. The method of claim 10, further comprising determining dynamically the throughput requirements of the higher-priority traffic on the wireless medium.

12. The method of claim 11, further comprising determining dynamically the desired throughput ratio between the higher priority AC and the lower-priority AC.

13. The method of claim 10, wherein the two different traffic classes include one for voice or video, and one for best effort or background.

14. The method of claim 10, operative on the access point.

15. The method of claim 10, wherein the one or more AC-sensitive parameters include at least one of AIFSN, TXOP and CWmin for at least one AC.

16. The method of claim 10, wherein the one or more AC-sensitive parameters includes TXOP, and further comprising computing TXOP[LP]=TXOP[HP]×k, where 1:k refers to the desired throughput ratio between the higher-priority AC and the lower-priority AC.

17. The method of claim 10, wherein the one or more AC-sensitive parameters includes CWmin, and further comprising computing CWmin[LP]=CWmin[HP]/k, where 1:k refers to the desired throughput ratio between higher-priority AC and the lower-priority AC.

18. The system of claim 10, wherein the wireless communication module communicates the data by using the sensitive parameters AIFSN[LP] set the value A with probability p and AIFSN[LP] set the value A-1 with probability 1−p.

19. A system comprising:
means for monitoring traffic on a wireless medium, the traffic belonging to one or more of two different access classes (ACs), one access class (AC) being a higher-priority AC and the other being a lower-priority AC;
means for dynamically generating data corresponding to one or more AC-sensitive parameters based on the monitored traffic and on a desired throughput ratio between the two different ACs; and
means for communicating the data to one or more wireless stations on the wireless medium,
wherein the one or more AC-sensitive parameters includes AIFSN, which is computed based on the following equations:

$$AIFSN\_Lag = T1 + T2,$$

$$T1 = \frac{\log\left(\frac{N_1 + N_2}{N_1/k_i + N_2}\right)}{N_1 \log(1-\tau)},$$

$$T2 = \frac{\log\left(\frac{1-\tau}{1-p\tau}\right)}{\log(1-\tau)},$$

$$p = \frac{1-(1-\tau)^f}{\tau}, \text{ and}$$

$$A = AIFSN[HP] + D$$

where N1 refers to the number of higher-priority AC streams, N2 refers to the number of lower-priority AC streams, 1:ki refers to the desired throughput ratio between the higher-priority AC and the lower-priority AC, τ refers to the steady state probability of channel access for the higher priority stations, A refers to one of two AIFSN[LP] values, p refers to a probability of selecting value A as the AIFSN[LP] value, f refers to the fractional component of T1, D refers to the smallest integer greater than or equal to T1, and AIFSN_Lag refers to the difference between AIFSN[LP] and AIFSN[HP].

20. The system of claim 19, wherein the wireless communication module communicates the data by using the sensitive parameters AIFSN[LP] set the value A with probability p and AIFSN[LP] set the value A-1 with probability 1−p.

21. A system comprising:
an Access Point (AP) with a throughput adaptation module to compute AC-sensitive parameters for higher-priority stations and lower-priority stations to achieve a desired throughput ratio between them;
wherein the one or more AC-sensitive parameters includes AIFSN and the throughput adaptation module computes the AIFSN of the AC-sensitive parameters based on the following equations:

$$AIFSN\_Lag = T1 + T2,$$

$$T1 = \frac{\log\left(\frac{N_1 + N_2}{N_1/k_i + N_2}\right)}{N_1 \log(1-\tau)},$$

$$T2 = \frac{\log\left(\frac{1-\tau}{1-p\tau}\right)}{\log(1-\tau)},$$

$$p = \frac{1-(1-\tau)^f}{\tau}, \text{ and}$$

$$A = AIFSN[HP] + D$$

where N1 refers to the number of higher-priority AC streams, N2 refers to the number of lower-priority AC streams, 1:ki refers to the desired throughput ratio between the higher-priority AC and the lower-priority AC, τ refers to the steady state probability of channel access for the higher priority stations, A refers to one of two AIFSN[LP] values, p refers to a probability of selecting value A as the AIFSN[LP] value, f refers to the fractional component of T1, D refers to the smallest integer greater than or equal to T1, and AIFSN_Lag refers to the difference between AIFSN[LP] and AIFSN[HP],
wherein the lower-priority wireless station which performs EDCA channel access uses AIFSN parameter value AIFSN[LP] which is picked uniformly randomly from two available choices: A and (A-1), the probability to choose AIFSN[LP]=A is p where as the probability to choose AIFSN[LP]=(A-1) is (1−p), and AIFSN[LP] is chosen each time before a new packet transmission is started; and
wherein the higher-priority wireless station which performs EDCA channel access uses AIFSN parameter value AIFSN[HP].

22. A method for a wireless system, the wireless system comprising an Access Point (AP) with a throughput adaptation module to compute AC-sensitive parameters for higher-priority stations and lower-priority stations to achieve a desired throughput ratio between them, the method comprising:
computing AIFSN of the AC-sensitive parameters based on the following equations:

$$AIFSN\_Lag = T1 + T2,$$

$$T1 = \frac{\log\left(\frac{N_1 + N_2}{N_1/k_i + N_2}\right)}{N_1 \log(1-\tau)},$$

$$T2 = \frac{\log\left(\frac{1-\tau}{1-p\tau}\right)}{\log(1-\tau)},$$

$$p = \frac{1-(1-\tau)^f}{\tau}, \text{ and}$$

$$A = AIFSN[HP] + D$$

where N1 refers to the number of higher-priority AC streams, N2 refers to the number of lower-priority AC streams, 1:ki refers to the desired throughput ratio between the higher-priority AC and the lower-priority AC, τ refers to the steady state probability of channel access for the higher priority stations, A refers to one of two AIFSN[LP] values, p refers to a probability of selecting value A as the AIFSN[LP] value, f refers to the fractional component of T1, D refers to the smallest integer greater than or equal to T1, and AIFSN_Lag refers to the difference between AIFSN[LP] and AIFSN [HP];

performing EDCA channel access, by the lower-priority wireless station, using AIFSN parameter value AIFSN [LP] picked uniformly randomly from two available choices: A and (A-1). The probability to choose AIFSN [LP]=A is p where as the probability to choose AIFSN [LP]=(A-1) is (1−p), and AIFSN[LP] is chosen each time before a new packet transmission is started, performing EDCA channel access, with the higher-priority wireless station using AIFSN parameter value AIFSN [HP].

* * * * *